(12) United States Patent
Rajkotia et al.

(10) Patent No.: US 8,160,002 B2
(45) Date of Patent: Apr. 17, 2012

(54) METHOD AND DEVICE ACK/NACK SLOT POSITIONING

(75) Inventors: Amol Rajkotia, San Diego, CA (US); Albert J. Harnois, Jr., Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 729 days.

(21) Appl. No.: 11/772,505

(22) Filed: Jul. 2, 2007

(65) Prior Publication Data
US 2008/0125137 A1 May 29, 2008

Related U.S. Application Data

(60) Provisional application No. 60/817,671, filed on Jun. 30, 2006.

(51) Int. Cl.
*H04W 4/00* (2009.01)
(52) U.S. Cl. ......... 370/328; 370/329; 370/330; 370/332
(58) Field of Classification Search .................. 370/329, 370/331, 332, 433, 435, 328, 338, 337, 347, 370/345, 350; 455/63.1, 67.13; 375/341, 375/347, 267
See application file for complete search history.

(56) References Cited

U.S. PATENT DOCUMENTS

| | | | | |
|---|---|---|---|---|
| 5,436,899 A | * | 7/1995 | Fujino et al. | 370/433 |
| 5,659,569 A | * | 8/1997 | Padovani et al. | 370/479 |
| 6,563,806 B1 | * | 5/2003 | Yano et al. | 370/330 |
| 7,006,482 B1 | * | 2/2006 | Choi et al. | 370/342 |
| 7,257,760 B2 | | 8/2007 | Rick et al. | |
| 7,342,876 B2 | * | 3/2008 | Bellur et al. | 370/221 |
| 2003/0119452 A1 | * | 6/2003 | Kim et al. | 455/69 |
| 2005/0013263 A1 | * | 1/2005 | Kim et al. | 370/320 |
| 2005/0195849 A1 | * | 9/2005 | Rajkotia et al. | 370/428 |
| 2005/0260998 A1 | * | 11/2005 | Casaccia et al. | 455/452.2 |
| 2006/0215618 A1 | * | 9/2006 | Soliman et al. | 370/337 |
| 2007/0133515 A1 | * | 6/2007 | Kumar et al. | 370/352 |
| 2007/0211620 A1 | * | 9/2007 | McBeath et al. | 370/209 |
| 2007/0280217 A1 | * | 12/2007 | Flanagan et al. | 370/356 |

(Continued)

FOREIGN PATENT DOCUMENTS
EP    1246385    10/2002
(Continued)

OTHER PUBLICATIONS

Mingxi Fan et al: "On the reverse link performance of cdma2000 1xEV-DO revision a system" Communications, 2005. ICC 2005. 2005 IEEE International Conference on Seoul, Korea, May 16-20, 2005, Piscataway, NJ, ISA, IEEE, May 16, 2005, pp. 2244-2250, XP010826268.

(Continued)

*Primary Examiner* — Jean Gelin
(74) *Attorney, Agent, or Firm* — Qualcomm Patent Group; James H. Yancey, Jr.

(57) ABSTRACT

Embodiments describe reducing interference in a wireless communication network, including an ad hoc network. According to an embodiment, a method for reducing interference includes receiving a data packet and determining a channel quality level of the received data packet. The method further includes calculating a number of groups to divide the data packet into based on the channel quality level and determining a slot position within each group. The positioning of an acknowledgment channel within each group can be optimized to reduce the amount of overhead channels or to provide time to decode a traffic channel.

25 Claims, 10 Drawing Sheets

U.S. PATENT DOCUMENTS

2008/0151921 A1* 6/2008 Gentle et al. .................. 370/412

FOREIGN PATENT DOCUMENTS

| JP | 6501349 | | 2/1994 |
|----|---------|---|--------|
| JP | 8279800 | A | 10/1996 |
| JP | 10512415 | T | 11/1998 |
| JP | 11150749 | A | 6/1999 |
| JP | 2000013301 | A | 1/2000 |
| JP | 2003219481 | | 7/2003 |
| JP | 2005252980 | A | 9/2005 |
| JP | 2007526724 | | 9/2007 |
| WO | 2005109792 | | 11/2005 |

OTHER PUBLICATIONS

Younsun Kim et al: "Performance of HARQ and the effect of imperfect power control in CDMA reverse link" Global Telecommunications Conference, 2004, GLOBECOM '04. IEEE Dallas, TX, USA Nov. 29-Dec. 3, 2004 pp. 3017-3021, XP010758276.

Yavuz M et al: "Adaptive rate control in high data rate wireless networks" Wirless Communications and Networking, 2003. WCNC 2003. 2003 IEEE Mar. 16-20, 2003, Piscataway, NJ, USA, IEEE, vol. 2, Mar. 16, 2003, pp. 866-871, XP010639881.

Chattedee M et al: "MAC Layer retransmission in 1xtreme" Personal Indoor and Mobile Radio Communications, 2002. The 13th IEEE International Symposium on Sep. 15-18, 2002, Piscataway, NJ, USA, IEEE, vol. 3, Sep. 15, 2002, pp. 1452-1456, XP010611504.

International Search Report—PCT/US2007/072572, International Search Authority—European Patent Office—Apr. 4, 2008.

Written Opinion—PCT/US2007/072572, International Search Authority—Euopean Patent Office—Apr. 4, 2008.

Taiwan Search Report—TW096124073—TIPO—Sep. 6, 2011.

Japanese Office Action—May 12, 2011—English translation of Official Action.

* cited by examiner

METHOD AND DEVICE ACK/NACK SLOT POSITIONING

This application claims priority to U.S. Provisional Application No. 60/817,671 filed Jun. 30, 2006.

BACKGROUND

I. Field

The following description relates generally to wireless communications and more particularly to reducing interference and increasing capacity in ad hoc wireless communication networks.

II. Background

Wireless communication networks are commonly utilized to communicate information regardless of where a user is located (inside or outside a structure) and whether a user is stationary or moving (e.g., in a vehicle, walking). Generally, wireless communication networks are established through a mobile device communicating with a base station, access point or node as commonly referred to in the art. The access point covers a geographic range or cell and, as the mobile device is operated, it may move in and out of these geographic cells. To achieve uninterrupted communication the mobile device deregisters with the cell it is exiting and registers with the cell it has entered.

In some embodiments, a network can be constructed utilizing solely peer-to-peer communication without utilizing access points. In further embodiments, the network can include both access points (infrastructure mode) and peer-to-peer communication. These types of infrastructure are referred to as ad-hoc networks or independent basic service sets (IBSS). Ad-hoc networks can be self-configuring whereby when a mobile device (or access point) receives communication from another mobile device, the other mobile device is added to the network. As the mobile devices leave the area, they are dynamically removed from the network. Thus, the topography of the network can be constantly changing.

In both ad hoc and infrastructure wireless networks, interference can be caused by a plurality of factors, including data transmissions that affect communication of data to neighboring nodes. In an infrastructure mode, access points can be moved or oriented differently to reduce some interference. However, in ad-hoc networks, where there may be no centralized transmission, a device in the vicinity can cause the interference. Attempts have been made to reduce interfere with closed loop power control, time hopping, or frequency hopping techniques. However, the reduction of interference utilizing such techniques is not effective when either interference avoidance and/or when closed loop is disabled. Overcoming the aforementioned problems, can increase capacity and quality of data transfer in ad-hoc voice communication networks. Reduction of latency associated with overhead channels, such as the acknowledgment, power control and pilot channels can also increase communication efficiency. Therefore, there is a need in the art to provide solutions to the above identified problems.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

According to an aspect is a method for transmitting data in a wireless communication network. The method includes detecting a channel quality level of a data packet. A number of groups to divide the data packet into are calculated based on the channel quality level. A slot positioning within each group is determined and the positioning of an acknowledgment channel within each group can reduce the number of overhead channels or provide time to decode a traffic channel.

According to another aspect is an apparatus for reducing data interference in a communication network. The apparatus includes a component that receives a data communication. Also included is an optimization component that determines at least one of a channel condition and a slot group arrangement of the data communication. An acknowledgment component that transmits an acknowledgment signal upon successful receipt and decode of the data communication is also included in the apparatus. After transmitting the acknowledgment signal, the remaining traffic signals for the data communication are not received, thus, providing an interference free period.

According to another aspect is a method of reducing wireless communication interference. The method includes sending a communication in a predetermined number a groups, each group having a traffic channel and acknowledgement channel. A first group is sent that includes a first traffic channel and it is ascertained whether an acknowledgment is received. If an acknowledgement is received, a second and subsequent traffic channel is not sent, providing an interference free period. If an acknowledgement is not received, a second or subsequent traffic channel is sent.

According to still another aspect is a system for reducing interference in an ad-hoc wireless communication network. The system includes means for receiving a communication that includes a traffic channel and means for analyzing a condition of the traffic channel. Also included in the system is means for grouping the communication into slots based in part on the ascertained condition of the traffic channel and means for selectively positioning an acknowledgment channel within each of the groups.

Still another aspect is a computer readable medium having stored thereon computer-executable instructions for reducing interference in a wireless communication network, which can be an ad-hoc network. The medium includes instructions for receiving a communication signal and ascertaining an appropriate communication signal grouping as a function of a channel quality of the communication signal. The instructions further include determining a placement of an overhead bit included in the communication signal. The instructions may further include sending an acknowledgment signal upon successful receipt of the communication signal. If the communication signal was not successfully received and decoded, the instructions can include sending a negative acknowledgment signal.

Yet another aspect is a processor that executes instructions for mitigating interference in a wireless communication network. The instructions include receiving a data communication and determining at least one of a channel condition and a slot grouping arrangement of the data communication. The instructions can further include transmitting an acknowledgment signal upon successful receipt and decode of the data communication.

To the accomplishment of the foregoing and related ends, one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media and/or machine-readable medium having various data structures stored thereon. The term "machine readable medium" includes, but is not limited to wireless channels and other mediums capable of storing containing or carrying instruction(s) and/or data. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
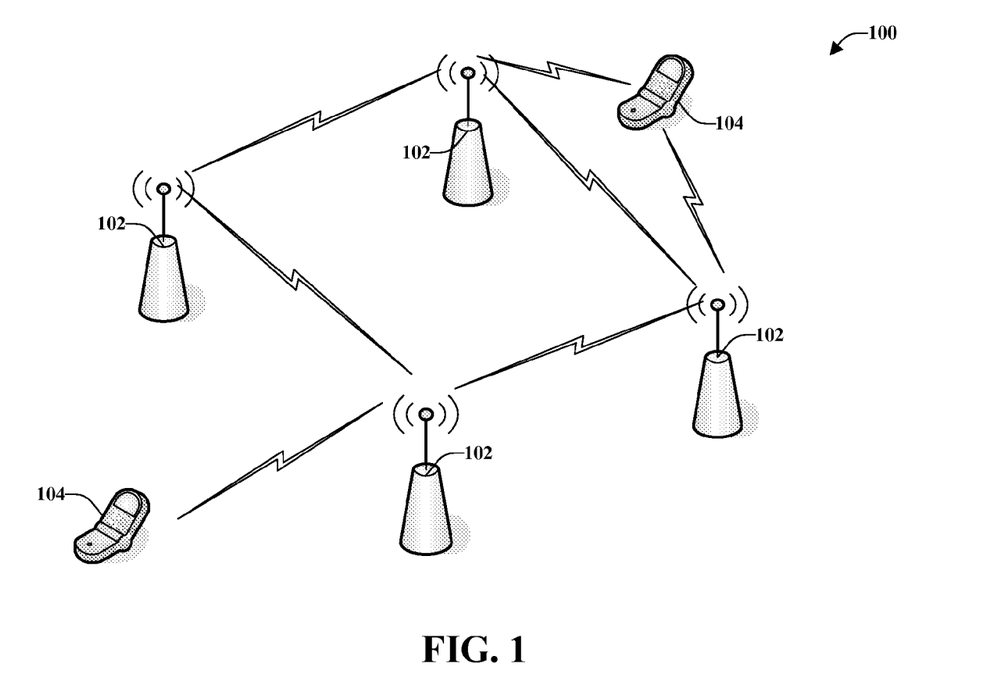
FIG. 1 illustrates a wireless network communication system in accordance with the various embodiments presented herein.

With reference now to the drawings, FIG. 1 illustrates a wireless network communication system 100 in accordance with various embodiments presented herein. Wireless system 100 can comprise one or more access point(s) 102 in one or more sectors that receive, transmit, repeat, etc., wireless communication signals to each other and/or to one or more mobile devices 104. Access point(s) 102 can represent an interface between wireless system 100 and a wired network (not shown).

Each access point 102 can comprise a transmitter and a receiver, each of which can in turn comprise a plurality of components associated with signal transmission and reception (e.g., processors, modulators, multiplexers, demodulators, demultiplexers, antennas, etc.), as will be appreciated by one skilled in the art. Mobile devices 104 can be, for example, cellular phones, smart phones, laptops, handheld communication devices, handheld computing devices, satellite radios, global positioning systems, PDAs, and/or other suitable devices for communicating over wireless network 100. In wireless system 100, the periodic transmission of small data packets (commonly referred to as beacons) from access point 102 can make known the presence of wireless system 100 and transmit system 100 information. Mobile devices 104 can sense the beacons and attempt to establish a wireless connection to access points 102 and/or to other mobile devices 104.

Communication interference in wireless system 100 can affect communication signals between mobile devices 104, increasing transmission time, and decreasing effective communication. In various embodiments, the plurality of data exchange can increase the interference of communication among various users. In a home environment, for example, family members can utilize an ultra-wide band (UWB) adhoc network. One person might be in a living room using a remote control, another person in a kitchen controlling appliances, and another person could be communicating multimedia content. In such a household, with the plurality of users as well as disparate wireless communication signals, a large amount of interference can be produced, which detracts from the potential quality of each person's received signal. Therefore, lowering interference between neighboring nodes may mean reducing transmission time and increasing the data exchange. It is to be appreciated from the following description that the disclosed embodiments can be utilized with numerous other situations (e.g., home, mall, tunnel, . . . ).

According to at least one aspect presented herein, keeping communication slots empty after a data exchange is successfully received can mitigate interference and can improve overall system efficiency. In addition or alternatively, the acknowledgment channel or overhead slots can be positioned at various places in the group of data or parts of the slot, including the beginning of the group, end of the group, split between both the beginning and end, or in the middle or between portions of the group, to optimize data communication. It should be understood that wireless system 100 can be an ad-hoc network. Such an ad-hoc network can be a peer-to-peer network or it can operate in the infrastructure mode (with access points) or can be a combination of an infrastructure mode and a peer-to-peer network.

Figure 2:
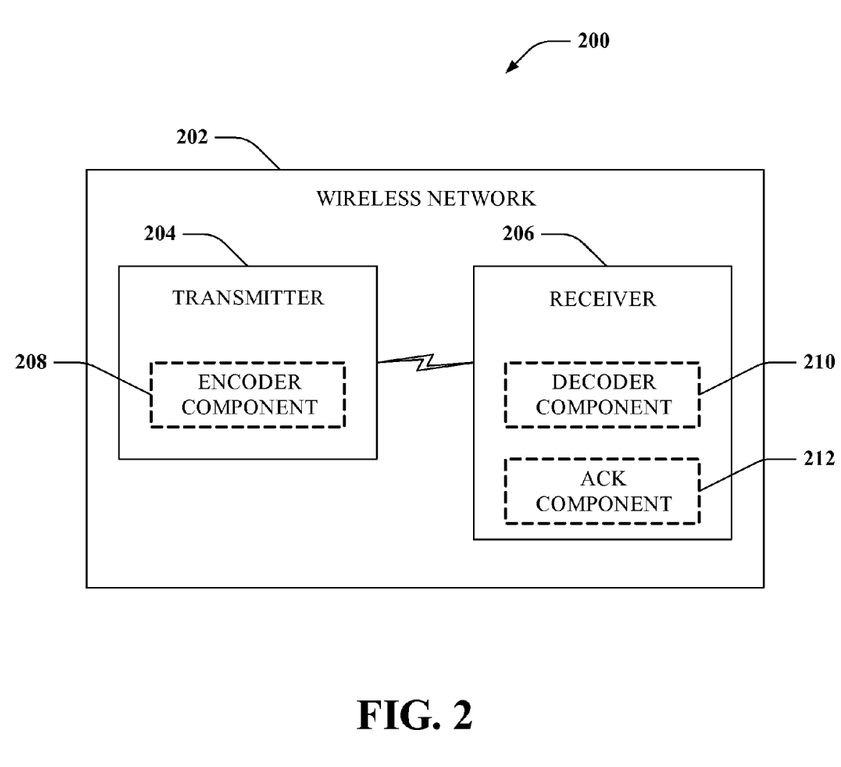
FIG. 2 illustrates a system that reduces interference in a wireless communication network utilizing time division duplexed (TDD) transmission.

FIG. 2 illustrates a system 200 that reduces interference utilizing time division duplexed (TDD) transmission. In the following detailed description, various aspects and embodiments may be described in the context of a TDD wireless communication systems. While the disclosed embodiments may be well suited for use with TDD, those skilled in the art will readily appreciate that these inventive aspects are likewise applicable for use in various other communication environments. Accordingly, references to a TDD wireless communication system is intended only to illustrate the various embodiments, with the understanding that such inventive aspects have a wide range of applications.

System 200 comprises a wireless network 202, similar to wireless system 100 described above, that includes a transmitter 204 and receiver 206. Although a number of transmitter(s) 204 and receiver(s) 206 can be included in wireless network 202, as will be appreciated, a single transmitter 204 that transmits communication data signals to a single receiver 206 is illustrated for purposes of simplicity. Transmitter 204 includes an encoder component 208 that can modulate and/or encode signals in accordance with a suitable wireless communication protocol (e.g., OFDM, OFDMA, CDMA, TDMA, GSM, HSDPA, . . . ), which signals can then be transmitted to receiver 206. Encoder component 208 can be a voice coder (vocoder) that utilizes a speech analyzer to convert analog waveforms into digital signals or another type of encoder.

Receiver 206 includes a decoder component 210 that can decode a received signal and/or data packet therein for processing. Upon successful decode of a data packet, an acknowledgment (ACK) component 212 can generate an acknowledgment that indicates successful decode of the data packet, which can be sent to transmitter 204 to inform transmitter 204 that the data packet was received and decoded, and therefore need not be retransmitted.

Acknowledgment component 212 can further transmit a negative acknowledgment (NACK) if there was not a successful decode of the data packet. The NACK can be sent to the transmitter 204 to inform transmitter 204 that the data packet was not received and/or not successfully decoded by receiver 206. Thus, transmitter 204 can retransmit the data packet, or a portion thereof, if further communication of such data is to be transmitted.

Transfer of information between transmitter 204 and receiver 206 can be time division duplexed (TDD). In a TDD system a common carrier is shared between the uplink and downlink, the resource being switched in time. Users are allocated one or more timeslots for uplink and downlink transmission. TDD systems allow asymmetric flow, which can be more suited to data transmission.

Fixed length voice frames from the vocoder, for example, are divided into multiple slots of much shorter duration. Since voice frames run at extremely low bit rates ($R_b$ kilo-bits per second), they occupy a large number of slots. In multiple access communication, interference is reduced by a node requesting transmission to be terminated upon successful reception of only a fraction of the total number of slots to be transmitted. The termination request is conveyed through an ACK channel. In order to reduce overhead while at the same time providing considerable capacity gains, an acknowledgment (ACK) is sent on a group of slots rather than on a slot-by-slot basis.

Apart from grouping of slots to reduce overhead, the appropriate positioning of the ACK channel within the slot grouping provides adequate time for the receiver 206 to decode the traffic channel and decide whether to set the ACK bit to "1" indicating the communication was successfully received and decoded. If receiver 206 does not successfully receive and/or decode the communication, the ACK bit can be set to "0" or a negative acknowledgment (NACK), thus further communication will be transmitted between transmitter 204 and receiver 206. If the ACK bit, set to "1", is received by transmitter 204, further information relating to that particular communication group is not sent to receiver 206. Thus, the ACK channel does not have to take up several slots of transmission, e.g., there is no need for guard slots. In order for transmitter 204 to respond to the ACK channel and determine whether to continue or terminate transmission of subsequent slots, the decoding of the ACK channel should be performed quickly. Appropriate design of low complexity codes and modulation methods for the ACK channel can provide a node the means to quickly decode the information sent from the transmitting node and terminate transmission of the remaining slots based on whether the ACK bit is set to "1" or "0" (NACK). The complexity code utilized can be known codes or future codes that can optimize the system. The grouping of slots and the time positioning of the channels is not fixed but should be optimized for the different data rates system 200 supports.

Figure 3:
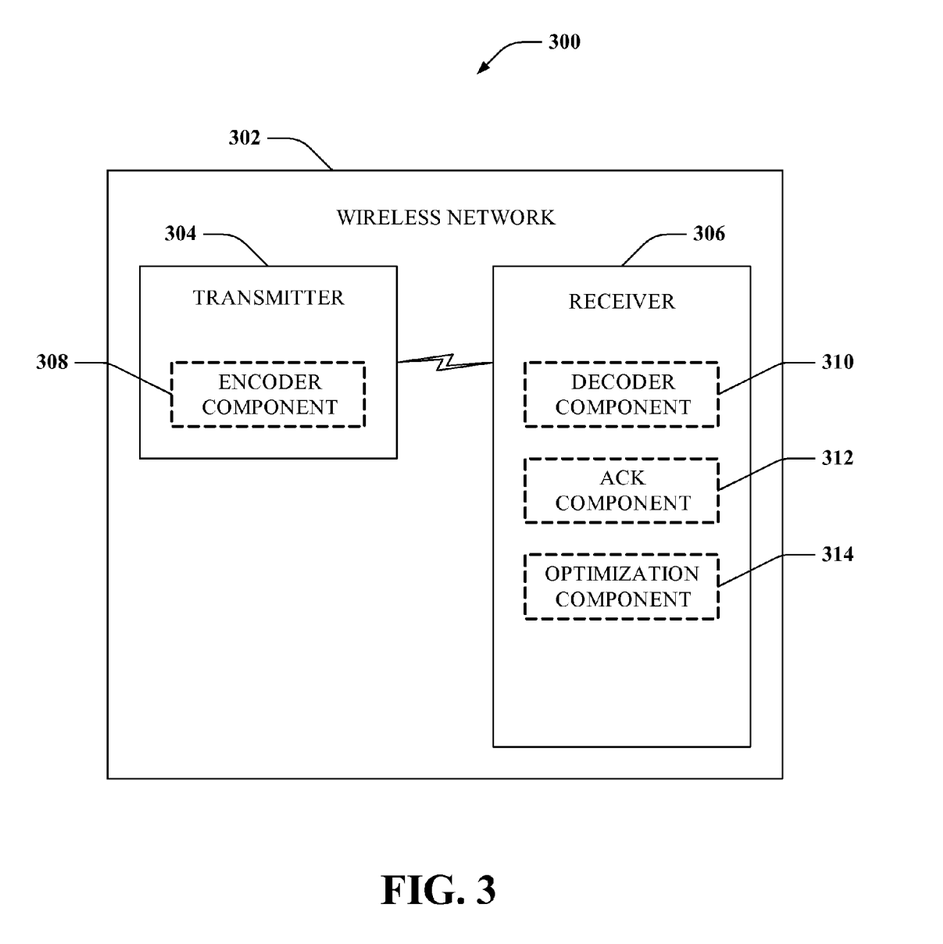
FIG. 3 illustrates a system that reduces interference in wireless communication networks.

With reference now to FIG. 3, illustrated is a system 300 that reduces interference in wireless communication networks. System 300 includes a wireless network 302, similar to wireless network 100 that can be an ad-hoc network that is solely a peer-to-peer network. Alternatively network 302 can be an ad-hoc network that includes an infrastructure mode having access points or an ad-hoc network that is a combination of both peer-to-peer and infrastructure mode. Wireless network 302 includes a transmitter 304 that sends data to a receiver 306. Transmitter 304 includes an encoder 308 (or vocoder) component that encodes signals and/or data packets for transmission to receiver 306.

Receiver 306 includes a decoder component 310, an acknowledgment (ACK) component 312, and an optimization component 314. Decoder component 310 can decode a received signal and/or data packets therein for processing. ACK component 312 can employ an acknowledgment technique in conjunction with an ACK/NACK protocol. The ACK/NACK is transmitted on an ACK channel and allows receiver 306 to inform transmitter 304 to stop transmitting the remaining groups of a packet if the receiver 306 successfully received and decoded the packet. In such a manner, there can be a period during which no data is transmitted, thus reducing interference for neighboring nodes in network 302.

Optimization component 314 is configured to make a determination as to an appropriate signal grouping as a function of the channel quality, which can be carrier-to-noise (C/N) ratio. For purpose of explanation, various aspects of the invention will be described with reference to C/N. However, it should be noted that other measures of the channel quality can be used such as, for example, carrier-to-interference (C/I) ratio or signal-to-noise (S/N) ratio. There can be a minimum guaranteed channel quality, such that if the quality falls below a predetermined threshold level, grouping is not performed because of the poor channel quality and the unlikely possibility that the data will be communicated without using all the slots. For example, if there are ten slots, the packet can be grouped as two groups of five slots or as ten one slot groups, or other groupings that will provide a desired C/I ratio.

To minimize the greatest amount of interference the minimum number of slots per group necessary to communicate the data is utilized (e.g., one slot needed for communication and nine slots free of data). A group index is included in the packet or data communication to indicate the number of groups into which the communication or packet has been divided. For example, for high rates of data communication a group index might not be present because the packet might be sent as one group of data. For medium communication rates the group index might be 1-1, indicating that if there are ten slots, the packet is divided into two groups of five slots, for example. For low communication rates, the group index might be 0-0, indicating that there is no grouping because the channel quality is low and it is expected that all slots are needed. Since grouping is a function of channel quality, the quality imposes constraints on whether or not to group. For example, in a tunnel or other area where there is may be a lot of interference, there might not be grouping because in such a situation it might be known that each slot may be necessary to successfully communicate the data. In other embodiments, when the channel is fluctuating, grouping can be utilized because all the groups may not be necessary, thereby reducing interference.

Optimization component 314 additionally or alternatively can be configured to make a determination as to placement of an overhead bit. A physical layer packet (PLP) can be partitioned into two channels: overhead and payload or traffic channel (TCH). The overhead channels include pilot channel (PCH), control channel, acknowledgment channel (ACK), and power control channel (PC). The overhead bit(s) can be placed anywhere with respect to the individual location packet (e.g., the individual traffic channel). For example, the overhead bit(s) (e.g., acknowledgment, power control, pilot channel) can be placed at the beginning and end of the packet, all at the beginning of the packet, all at the end of the packet, or split up in the packet, such as in the middle of the packet. It should be understood that if the ACK channel is placed at the beginning, a buffer is utilized to mitigate an acknowledgment signal being sent before the packet is decoded.

Optimization component 314 can further be configured to determine whether to utilize closed loop or open loop power control. Closed loop power control is a function of grouping and open loop power control is a function of scheduling. Closed loop power control allows the power level of the terminal to be set by another terminal, such as a terminal that is receiving the signal from the terminal whose power level is being set. In open loop power control, the power level is set to a target terminal based on the strength of the signal that is received from that terminal. In a simple embodiment, there are two nodes and one is the master node that decides the scheduling. When a third node is added, which is common in an ad-hoc network, scheduling is necessary because two different packets may be sent at the same time and if they are in close proximity, they may interfere with each other. System 300 can utilize a combination of both open loop power control and closed loop power control. In another embodiment optimization component 314 can be associated with transmitter 304, wherein transmitter 304 is configured to make a determination as to an appropriate signal grouping, placement of an overhead bit, and/or whether to utilize open loop or closed loop power control.

Figure 4:
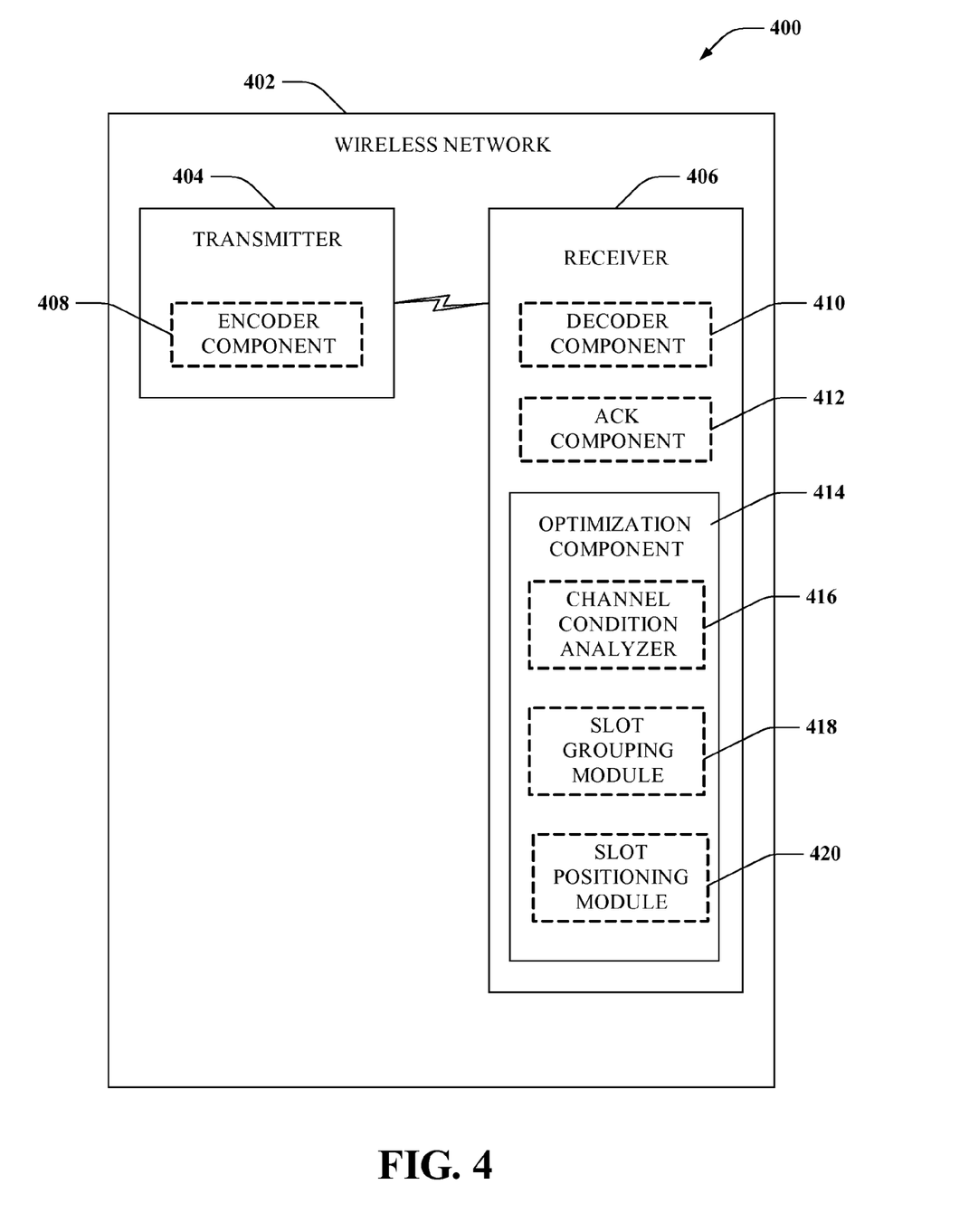
FIG. 4 illustrates a system that facilitates determining the configuration of a data communication.

FIG. 4 illustrates a system 400 that facilitates determining the configuration of a data communication. System 400 includes a wireless network 402 that can include a transmitter 404 and a receiver 406. The transmitter 404 is configured to transmit a wireless communication to the receiver 406. The transmitter 404 can include an encoder component 408 that encodes the communication prior to sending the communication. The receiver 406 can include a decoder component 410 that decodes the encoded communication and an acknowledgment (ACK) component 412 that transmits an acknowledgment message upon successful receipt of the communication by receiver 406. ACK component 412 can further send a negative acknowledgment (NACK) message if the communication is not successfully received and decoded by receiver 406.

Receiver 406 can include an optimization component 414 that determines at least one of a channel condition, a slot grouping, and a slot positioning arrangement. For example, optimization component 414 can include a channel condition analyzer 416, a slot grouping module 418, and/or a slot positioning module 420. Channel condition analyzer 416 is configured to analyze the condition of the channel. Channel condition analyzer 416 can determine, for example, a carrier-to-interference (C/I) measurement. In another embodiment, optimization component 414, channel condition analyzer 416, slot grouping module 418, and/or slot position module 420 can be included in transmitter 404 and associated functions performed by transmitter 404.

Slot grouping module 418 is configured to determine an appropriate grouping of slots based on parameters associated with the wireless communication and to provide a group indication that indicates the number of groups for that particular communication. For example, the grouping can be based on a C/I measurement. Channel condition analyzer 416 can operate in conjunction with slot grouping module 418 to facilitate mitigation of interference in wireless network 402. For example, if the C/I ratio is good, the transmission can occur at a very high rate (although not necessarily) and the communication might not need to be grouped. Thus, a group indicator is not necessary, and the communication can be sent as one packet or group containing all the slots.

Slot position module 420 can be configured to selectively determine slot positioning of the ACK channel. For example, the ACK channel can be located in various positions with respect to the group of data. For example, the ACK channel can be placed at the beginning of the group, at the end of the group, split (not necessarily evenly) and placed at both the beginning and the end of the group, or placed in the middle of the group or split (not necessarily evenly) and disbursed throughout the group. The particular placement of the ACK channel is determined in part to provide an optimal data communication while reducing interference for neighboring nodes in a wireless communication system 400.

Figure 5:
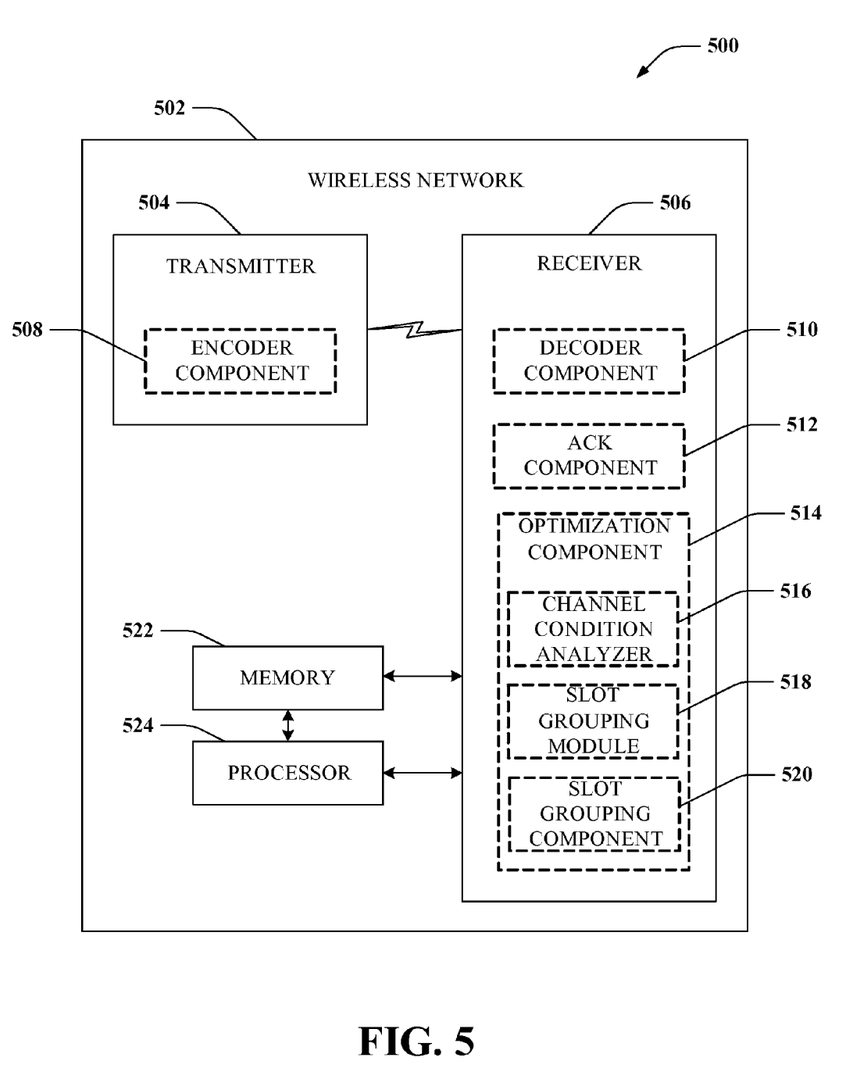
FIG. 5 illustrates another embodiment of a system that facilitates reducing interference in a communication network.

FIG. 5 illustrates a system 500 that facilitates reducing interference in a communication network. System 500 includes a wireless network 502, similar to the networks described in conjunction with the preceding figures. Network 502 is illustrated with a single transmitter 504 and a single receiver 506, however, a plurality of transmitters and receivers can be employed in system 500. Transmitter 504 includes an encoder component 508 that can encode outgoing signals according to a modulation scheme employed by network 502. Such signals can be received by receiver 506 and decoded by decoder component 510. An acknowledgment (ACK) component 512 can generate an acknowledgment indicative of successfully decoded data packets or layers transmitted in the signal and can return an acknowledgment to transmitter 504. ACK component 512 can generate a negative acknowledgment (NACK) if there was a problem in receiving the signal (e.g., a cyclic redundancy check does not match). As will be understood, optimization component 514, channel condition analyzer 516, slot grouping module 518, and/or slot positioning module 520 can be included in transmitter 504, whereby the particular functions are performed in the transmitter 504.

Receiver 506 can also include an optimization component 514 that is configured to lower interference to neighboring nodes. According to some embodiments, this can be accomplished through a channel condition analyzer 516, a slot grouping component 518, and/or a slot positioning module 520. Channel condition analyzer 516 is configured to analyze a condition of the channel and determine or calculate a C/I ratio measurement utilizing common calculation schemes. Slot grouping component 518 is configured to analyze information received from channel condition analyzer 516 and determine the optimal grouping of slots for each type of communication. Slot positioning component 520 can be configured to determine positioning of the ACK slot with the group of slots according to the aspects presented herein.

System 500 can include memory 522 operatively coupled to receiver 506. Memory 522 can store information related to data packets and/or layers received, decoded layers, acknowledged layers, layer energy estimation, and other suitable information related to reducing interference in a communication network 502. A processor 524 can be operatively connected to receiver 506 (and/or memory 522) to facilitate analysis of information related to reducing interference in a communication network 502. Processor 524 can be a processor dedicated to analyzing and/or generating information received by receiver 506, a processor that controls one or more components of system 500, and/or a processor that both analyzes and generates information received by receiver 506 and controls one or more components of system 500.

Memory 522 can store protocols associated with generating acknowledgments, reducing interference, taking action to control communication between receiver 506 and transmitter 504, etc., such that system 500 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 522 of the disclosed embodiments are intended to comprise, without being limited to, these and other suitable types of memory.

Figure 6:
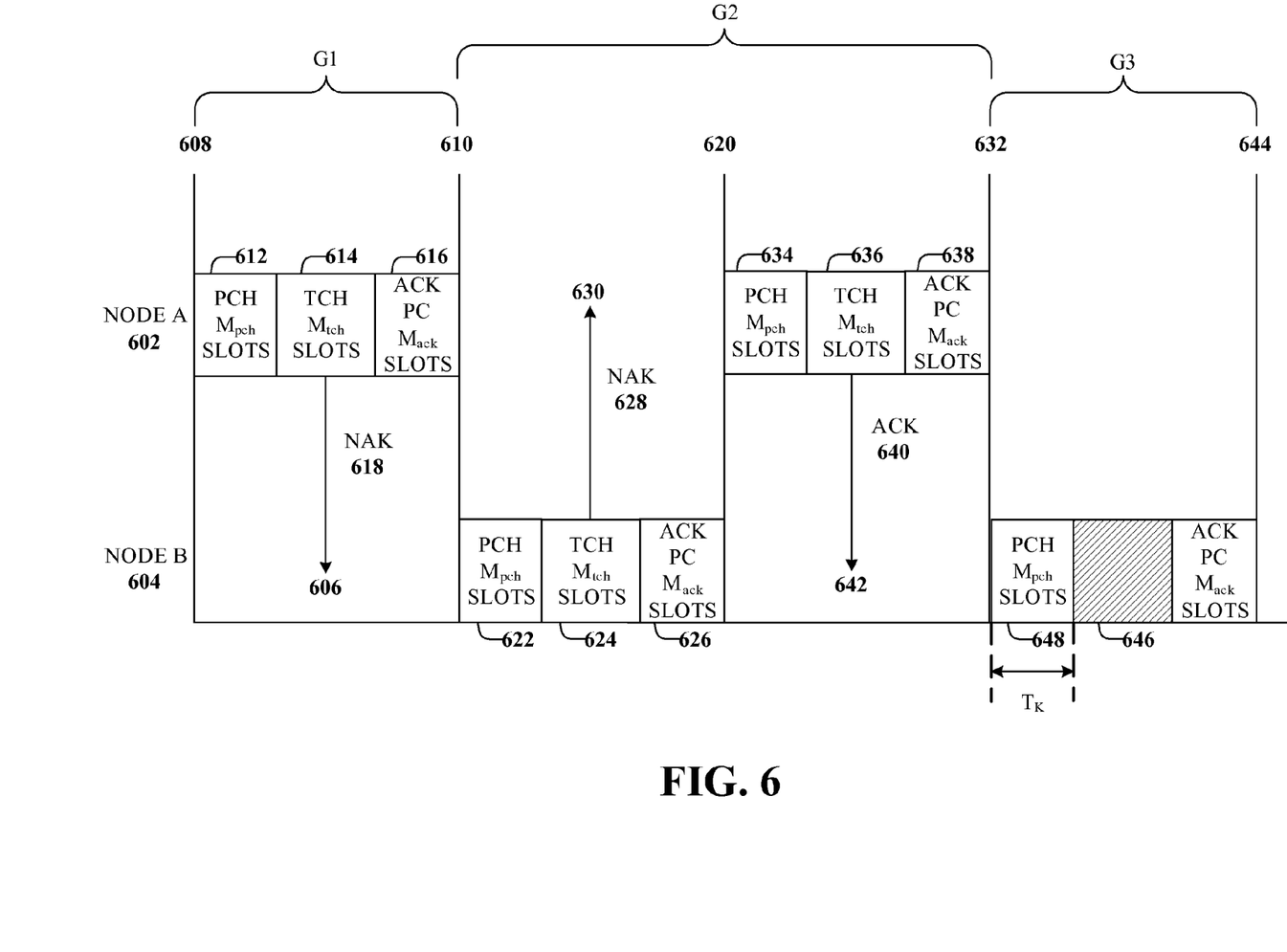
FIG. 6 illustrates terminal mode A and terminal mode B exchanging groups of slots.

FIG. 6 illustrates terminal Node A and terminal Node B exchanging groups of slots. Terminal Node A 602 can be in communication with terminal Node B 604 in accordance with some embodiments employing multiple access time division duplex (TDD) ad-hoc voice communication networks. While the following detailed description is described in the context of a TDD wireless communication system, those skilled in the art will appreciate that these aspects are likewise applicable for use in various other communication environments. Accordingly, references to a TDD wireless communication system are intended to illustrate the various aspects with the understanding that such aspects have a wide range of applications.

Illustrated in FIG. 6, both Node A 602 and Node B 604 are attempting to exchange a single voice physical layer packet (PLP). The PLP is divided into three groups, labeled G1, G2, and G3. It should be understood that while the PLP is shown and described with reference to three groups, the PLP can be divided into less or more groups and can have different channels and/or configurations than those shown and described. While the channels associated with Node A 602 and Node B 604 are shown in a particular position, it should be understood that placement of channel(s) should be optimized to take into account channel conditions (Doppler, multipath), overhead and decoding time.

Node A 602 initiates transmission and, at 606, sends group G1 to Node B 604 during a first time period, which is from 608 to 610 The transmission (G1) from Node A 602 can include various channels, including a pilot channel (PCH) 612 that includes $M_{PCH}$ slots, a traffic channel (TCH) 614 that includes $M_{TCH}$ slots, an acknowledgment channel (ACK) 616 that includes $MACK_{ACK}$ slots, where M is an integer. In some embodiments, the ACK channel is a subset of a control channel. In other embodiments, the ACK channel is a separate channel from the control channel. It should be understood that Node A 602 can further include power control channel(s) (PC). Initially Node A 602 sends a NAK 618 in the ACK channel 616 to terminal Node B 604.

Node B 604 also decodes the traffic slots ($M_{TCH}$) 614 and performs a cyclic redundancy check (CRC). A CRC is an example process to check the integrity of a block of data. The CRC includes a CRC character whose value is generally dependent upon the hexadecimal value of the number of ones in the data block. Node A 602 calculates the value and appends it to the data block that it sends. Node B 604 makes a similar calculation upon receipt of the data block and compares its results with the character appended by Node A 602. It should be noted that the integrity of a block of data can be determined using various other ways, for example, using RSSI, LQI, C/N, C/I, S/N or a combination thereof. For example, C/I can be used to determine the probability of a successful receipt of the block of data. Here, a table that indicates whether a value of C/I would be considered a successful receipt can be used. It should also be noted that if C/I is used in conjunction with CRC, for example, Node B 604 need not decode for CRC, thereby saving power.

During a second time period (from 610 to 620) Node B 604 sends Node

A 602 a signal that includes a group of slots. The group of slots sent from Node B 604 to Node A 602, can include a pilot channel (PCH) 622 that includes $M_{PCH}$ slots, a traffic channel (TCH) 624 that includes $M_{TCH}$ slots, an acknowledgment channel (ACK) 626 that includes $M_{ACK}$ slots, where M is an integer. If the CRC calculations do not match, Node B 604 requests retransmission by setting its ACK channel 626 to "0", thereby sending Node A 602 a NAK 628 at 630.

After receiving the communication, assuming Node A 602 receives all the information in the packet and decodes it successfully, Node A 602 can request Node B 604 to stop transmissions of the final group of slots (G3). Node A 602 sends Node B 604 a group of slots during the third time period (from 620 to 632), that is the second half of the G2 group. The group of slots sent by Node A 602 include a pilot channel (PCH) 634 that includes $M_{PCH}$ slots, a traffic channel (TCH) 636 that includes $M_{TCH}$ slots, and an acknowledgment channel (ACK) 638 that includes $M_{ACK}$ slots, where M is an integer. Node A 602 can set the ACK 638 bit to "1", thereby sending an ACK 640 to Node B 604 at 642.

During the next time period (from 632 to 644), Node B 604 decodes the ACK bit 638 sent by Node A 602 during time period $T_K$, and determines that it does not need to send the last TCH slots 646. The shaded region 646 indicates the interference free time duration. Notice that Node B 604 decode the ACK channel within the pilot (PCH) burst 648 starting at 632. According to other embodiments, to decode the ACK, the PCH 648 is utilized. Other embodiments can employ a longer pilot burst. According to further embodiments, the end of the previous pilot burst and the beginning of the current burst can be interpolated to aid in the decoding of the ACK. The time for a single slot can be a plurality of lengths and at low rates, the pilot channel can span several slots thus providing sufficient time for decoding the ACK channel, which is only a single bit.

Figure 7:
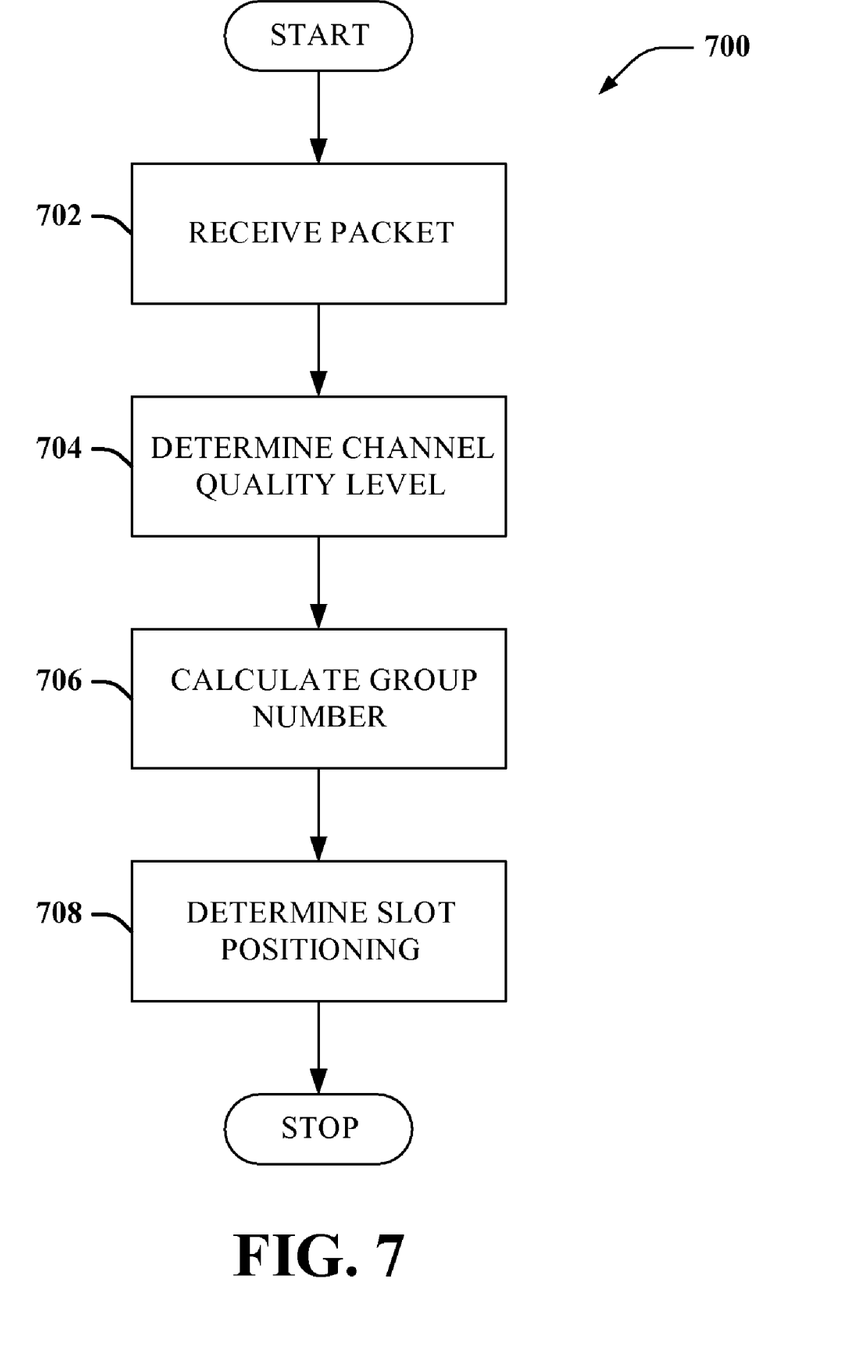
FIG. 7 illustrates a methodology for determining the number and placement of slots in a communication packet.
Figure 8:
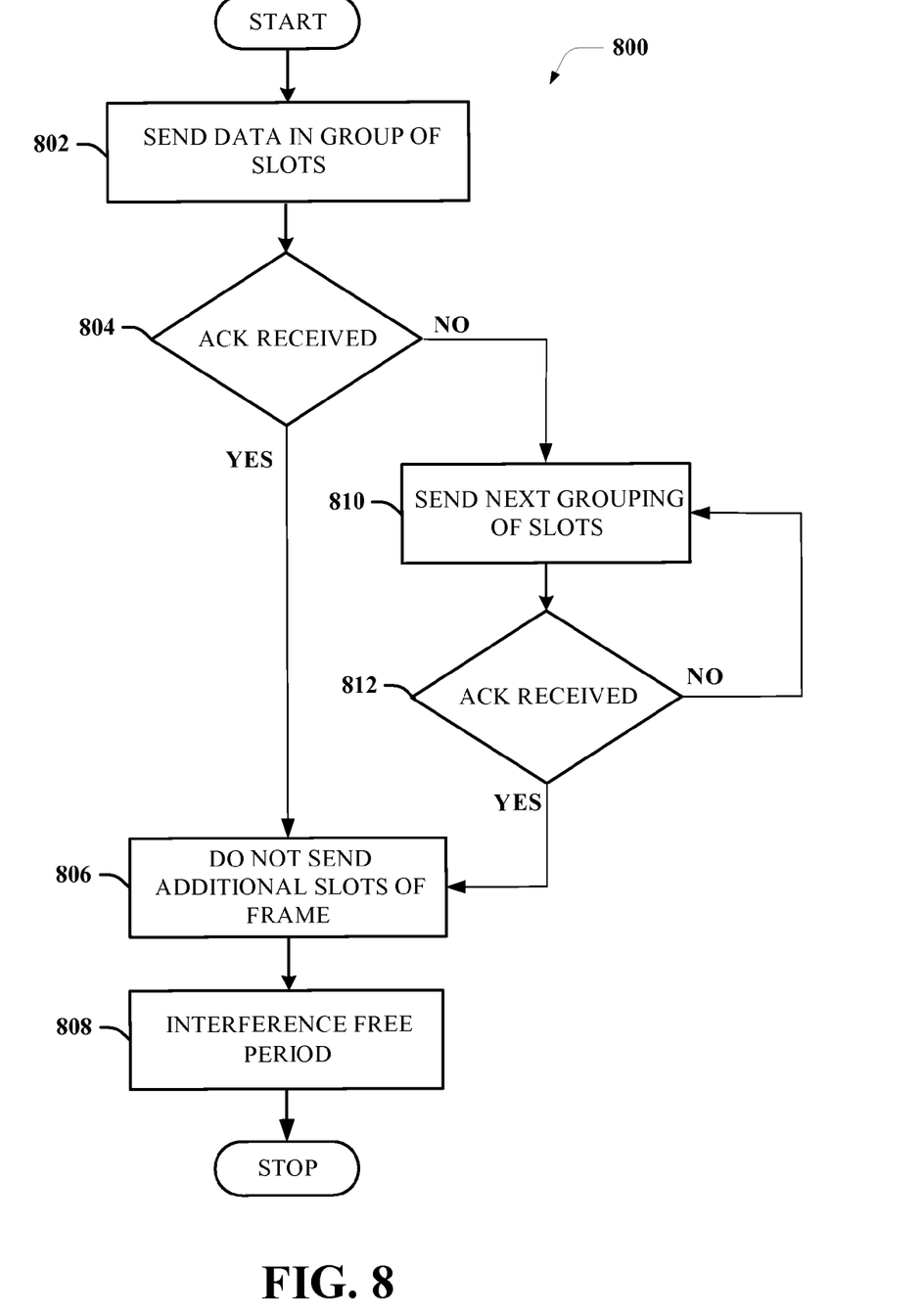
FIG. 8 illustrates a methodology for reducing interference in a wireless network.

In view of the systems shown and described above, methodologies, which may be implemented in accordance with one or more aspects of the disclosed embodiments, will be better appreciated with reference to the diagram of FIGS. 7-8. While, for purposes of simplicity of explanation, the methodologies are shown and described as a series of acts (or function blocks), it is to be understood and appreciated that the methodologies are not limited by the order of acts, as some acts may, in accordance with these methodologies, occur in different orders and/or concurrently with other acts from that shown and described herein. Moreover, not all illustrated acts may be required to implement a methodology in accordance with one or more aspects of the disclosed embodiments. It is to be appreciated that the various acts may be implemented by software, hardware, a combination thereof or other suitable means (e.g. device, system, process, component) for carrying out the functionality associated with the acts. It is also to be appreciated that the acts are merely to illustrate certain aspects presented herein in a simplified form and that these aspects may be illustrated by a lesser and/or greater number of acts. Those skilled in the art will understand and appreciate that a methodology could alternatively be represented as a series of interrelated states or events, such as in a state diagram.

FIG. 7 illustrates a methodology 700 for determining the number and placement of slots in a communication packet. Method 700 begins, at 702, when a packet is received. It should be understood that in other embodiments, receiving the packet can be performed at the end of the method 700. The packet is received first if a receiver is utilized to perform the method and if a transmitter is utilized to perform the method, the packet is received last.

A channel quality level of the received packet is determined, at 704. The determination can be based on a carrier-to-interference (C/I) measurement, which is the ratio of the amplitude of a frequency carrier to the amplitude of the interference (noise and other undesired carriers). Based on the determined channel quality level, the number of groups and number of slots per group is calculated, at 706. The slots are grouped at the physical layer. This determination can be performed by a receiver and/or a transmitter (e.g. in a symmetric channel). For example, if the receiver makes the determination, the receiver utilizes an algorithm that analyzes the channel condition and sets a flag to notify the transmitter to follow a predetermined grouping for an amount of time or based on another type of measurement. The algorithm can be a known determination, such as a C/I ratio or other means. If the transmitter makes the determination, it conveys the predetermined grouping to the receiver.

At 708, a slot positioning is determined. Here, the slot positioning may be determined for a slot including overhead. The positioning of the slots is optimized to reduce the overhead channels associated with the packet. The overhead channels can include the acknowledgment (ACK) channel, the power control channel, and/or the pilot channel(s). Appropriate positioning of the ACK channel within the slot grouping provides adequate time to decode the traffic channel and decide whether to set the ACK bit to "1" or to "0" (NACK). Thus, the ACK channel need not take up several slots of transmission, (e.g. there is no need for guard slots). In order for a node to respond to the ACK channel on whether to continue or terminate transmission of subsequent slots, the decoding of the ACK channel should be done quickly. By appropriate design of low complexity codes and modulation methods for the ACK channel, a node can quickly decode the information sent from the transmitting node and terminate transmission of the remaining slots based on whether the ACK bit is set to "1" (ACK) or to "0" (NACK). The grouping of slots and the time positioning of the channels is not fixed but is optimized for the different data rates the system supports.

With reference now to FIG. 8, illustrated is a methodology 800 for reducing interference in a wireless network. The method 800 begins at 802 where a communication is sent in a group of slots. A voice frame, for example, can run at extremely low bit rates ($R_b$ kilo-bits per second), thus they can occupy a large number of slots and the slots include a number of bits. At 804, a determination is made whether an acknowledgment (ACK) has been received. The ACK is an acknowledgment that the data has been successfully received and decoded by the recipient of the communication. If the data is successfully received and decoded ("YES") an ACK is received and the method continues, at 806, where the additional groups of slots are not sent, resulting in an interference free period, at 808, where no data is transmitted. The duration of the interference period is the amount of time remaining for that frame of data. For example, a frame can be divided into ten groups, if an ACK is received after three groups, the remaining seven groups are the interference free period. In another example, if the frame is divided into eight groups, and an ACK is received after seven groups are sent, the interference period is only for the remaining group. If the ACK was received after the eighth group was sent, there would be no interference free period.

If the data is not successfully received and/or decoded "NO", a negative acknowledgment (NACK) is received, at 804, and the next grouping of slots is sent, at 810. The method 800 continues, at 812, where a determination is made whether the data was successfully received and decoded as indicated by receipt of an "ACK". If the data was successfully received and decoded (an ACK was received at 812) "YES", the method 800 continues, at 806, and the remaining grouping of slots are not sent. If the data was not successfully received and/or decoded "NO", a NACK is received and the next grouping of slots are sent, at 810. It is to be understood that this act can be recursive such that a number of grouping of slots can be sent when a NACK is received. When there are no further grouping of slots to send, the method stops. That is to say, the data is divided into a predetermined number of groups having a predetermined number of slots. If a NACK is received for each group and the predetermined number of groups have been sent, the method 800 ends because there are no additional groups to send, regardless that the communication may not have been successfully received and decoded (NACK).

Figure 9:
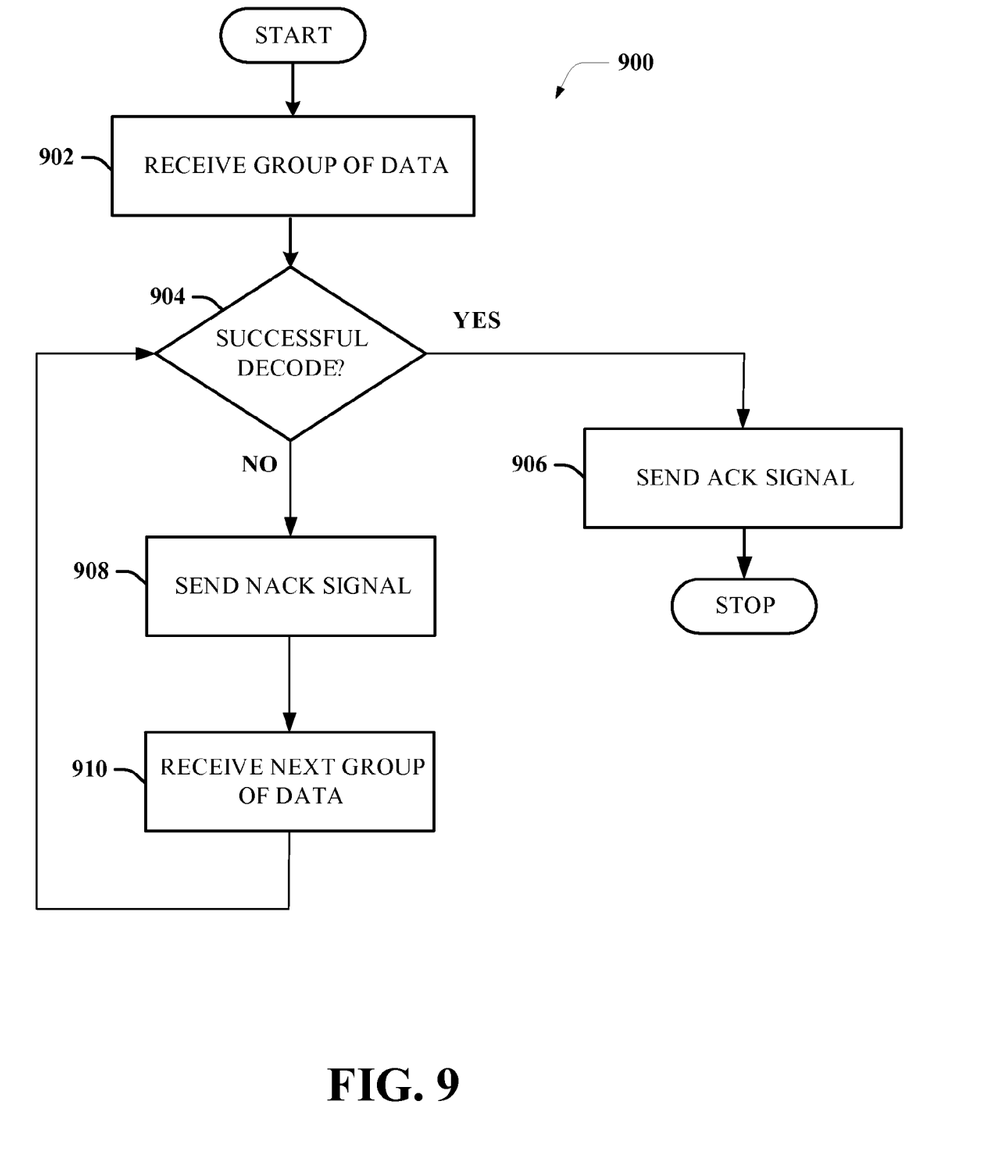
FIG. 9 illustrates another methodology for reducing interference in a wireless network.

FIG. 9 illustrates another methodology 900 for reducing interference in a wireless network. The method 900 begins at 902, where a group of data in the form of slots is received at, for example, a mobile device. A determination is made, at 904, whether the group of data was successfully received and decoded. For example, a CRC is calculated to determine if a calculated number corresponding to the data sent and appended to the communication matches a calculation corresponding to the data received. If both calculations match, the data was successfully received and decoded ("YES") and an acknowledgment (ACK) signal is sent at 906. The ACK signal indicates that further traffic channels do not have to be sent, and the slots corresponding to those channels can be empty. These empty slots provide an interference period during the traffic slot time period.

If the calculated numbers during the CRC do not match, the communication was not successfully received and/or decoded ("NO"), and a negative acknowledgment (NACK) signal is sent, at 908. The NACK signal indicates that further communication is necessary in order to successfully receive the communication. Thus, at 910, the next group of data or slots are sent. The method continues, at 904, with the determination whether the communication was successfully received and decoded. It is to be understood that this act can be continuous such that a number of groupings can be received up to a predetermined number of groups.

Figure 10:
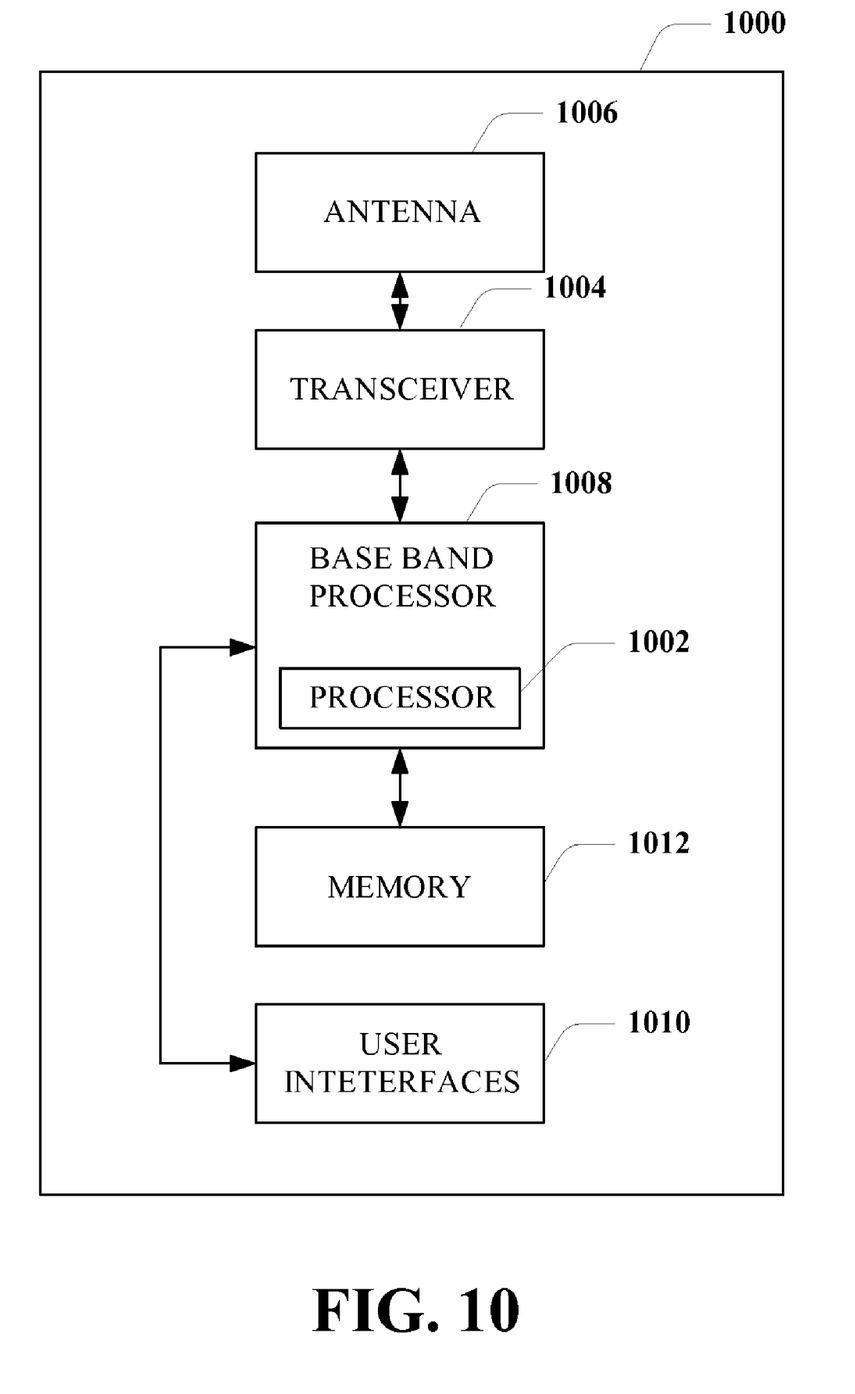
FIG. 10 illustrates a conceptual block diagram of a configuration of a wireless device or terminal.

With reference now to FIG. 10, illustrated is a conceptual block diagram of a possible configuration of a wireless device or terminal 1000. As those skilled in the art will appreciate, the precise configuration of the terminal 1000 may vary depending on the specific application and the overall design constraints. Processor 1002 can implement the systems and methods disclosed herein.

Terminal 1000 can be implemented with a front end transceiver 1004 coupled to an antenna 1006. The front end transceiver 1004 is configured to receive a data communication. A base band processor 1008 can be coupled to the transceiver 1004. The base band processor 1008 can be implemented with a software based architecture, or other types of architecture. A microprocessor can be utilized as a platform to run software programs that, among other functions, provide control and overall system management function. A digital signal processor (DSP) can be implemented with an embedded communications software layer, which runs application specific algorithms to reduce the processing demands on the microprocessor. The DSP can be utilized to provide various signal processing functions such as pilot signal acquisition, time synchronization, frequency tracking, spread-spectrum processing, modulation and demodulation functions, and forward error correction.

Terminal 1000 can also include various user interfaces 1010 coupled to the base band processor 1008. User interfaces 1010 can include a keypad, mouse, touch screen, display, ringer, vibrator, audio speaker, microphone, camera, and/or other input/output devices.

The base band processor 1008 comprises a processor 1002. In a software based implementation of the base band processor 1008, the processor may be a software program running on a microprocessor. However, as those skilled in the art will readily appreciate, the processor 1002 is not limited to this embodiment, and may be implemented by a plurality of means known in the art, including hardware configurations, software configuration, or combination thereof, which is capable of performing the various functions described herein. The processor 1002 can be coupled to memory 1012 for the storage of data. The memory 1012 is configured to store the program data received during a manufacturing and/or test process and the processor 1002 or 1008 is configured to be programmed with the program data.

It is to be understood that the embodiments described herein may be implemented by hardware, software, firmware, middleware, microcode, or a combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using suitable means including memory sharing, message passing, token passing, network transmission, etc.

What has been described above includes examples of one or more embodiments. It is, of course, not possible to describe every conceivable combination of components or methodologies for purposes of describing these embodiments, but one of ordinary skill in the art may recognize that many further combinations and permutations of such embodiments are possible. Accordingly, the embodiments described herein are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method for transmitting data in a wireless communication network, comprising:
    detecting a channel quality level of a channel of the wireless communication network;
    calculating a number of groups to divide a data packet into based on the channel quality level; and
    determining a slot positioning for slots including overhead data relative to slots including traffic data within each group based on the channel quality level, wherein determining a slot positioning for slots including overhead data relative to slots including traffic data comprises positioning an acknowledgment channel to provide time to decode a traffic channel.

2. The method of claim 1, wherein determining a slot positioning further comprises positioning an acknowledgment channel within each group to reduce the amount of overhead channels.

3. The method of claim 1, wherein detecting a channel quality level of a data packet further comprises calculating a carrier-to-interference ratio.

4. The method of claim 1, wherein detecting a channel quality level further comprises detecting a channel quality level based on a received data packet.

5. The method of claim 1, further comprising:
    setting a threshold quality level; and
    maintaining the data packet as one group of data if the detected quality level is below the set threshold quality level.

6. The method of claim 1, further comprising:
    setting a threshold quality level; and
    dividing the data packet into at least two groups if the detected quality level is at or above a predetermined threshold quality level.

7. A non-transitory computer readable medium having stored thereon computer executable instructions for carrying out the method of claim 1.

8. An apparatus for reducing data interference in a communication network, comprising:
    a component configured to receive a data communication;
    an optimization component configured to
        determine at least one of a channel condition based in part on characteristics of the received data communication,
        wherein the optimization component is further configured to determine a slot grouping arrangement of a second data communication based on the at least one of a channel condition, and
        wherein the optimization component is further configured to determine a slot positioning for slots including overhead data relative to slots including traffic data within each group based on the at least one of a channel condition, wherein determining a slot positioning for slots including overhead data relative to slots including traffic data comprises positioning an acknowledgment channel to provide time to decode a traffic channel; and an acknowledgment component that transmits an acknowledgment signal in the acknowledgment channel upon successful receipt and decode of the data communication.

9. The apparatus of claim 8, wherein after transmitting the acknowledgement signal, remaining traffic channels included in the data communication are not received.

10. The apparatus of claim 8, wherein the optimization component is further configured to determines a minimum channel condition quality level.

11. The apparatus of claim 10, wherein the optimization component is configured not to perform slot grouping if the channel condition quality level is below the minimum quality level.

12. The apparatus of claim 8, further comprising a decode component that decodes the data communication, wherein the optimization component is configured to determines a slot grouping arrangement based in part on a decode time to decode the data communication.

13. The apparatus of claim 12, wherein the acknowledgment component is configured to sets a bit in the acknowledgment channel to a one upon successful receipt and successful decode of the data communication.

14. The apparatus of claim 12, wherein the acknowledgment component is configured to sets the acknowledgment channel bit to a zero if the data communication is not successfully received or successfully decoded.

15. The apparatus of claim 8, wherein the component that receives a data communication comprises a receiver.

16. The apparatus of claim 8, wherein the component that receives a data communication comprises a transmitter.

17. A system for reducing interference in an ad-hoc wireless communication network, comprising:
means for receiving a communication that includes a traffic channel;
means for analyzing a condition of the traffic channel;
means for grouping a second communication into slots based in part on the analyzed condition of the traffic channel; and
means for selectively positioning an acknowledgment channel relative to slots including traffic data within each of the groups based in part on the analyzed condition of the traffic channel to provide time to decode traffic data.

18. The system of claim 17, wherein the means for analyzing a condition of the traffic channel are further configured to determine the condition of the traffic channel based on a carrier-to-interference ratio.

19. The system of claim 17, further comprising:
means for determining whether an acknowledgment is received; and
means for eliminating the communication of a traffic channel during a next group.

20. A non-transitory computer readable medium having stored thereon computer-executable instructions for:
receiving a communication signal;
determining an appropriate communication signal grouping as a function of a channel quality of the communication signal; and
determining a position of an overhead bit relative to slots including traffic data in a second communication signal as a function of a channel quality of the communication signal, wherein determining a position of an overhead bit relative to slots including traffic data in the second communication signal comprises determining a position of an acknowledgment channel to provide time to decode a traffic channel.

21. The non-transitory computer readable medium of claim 20, further comprising:
sending an acknowledgment signal upon successful receipt of the communication signal.

22. The non-transitory computer readable medium of claim 20, further comprising sending a negative acknowledgment signal if the communication signal was not successfully received and decoded.

23. The non-transitory computer readable medium of claim 20, wherein ascertaining an appropriate communication signal grouping is based in part on a carrier-to-interference ratio.

24. The non-transitory computer readable medium of claim 20, wherein the overhead bit is one of a pilot channel, a control channel, an acknowledgment channel, and a power control channel.

25. A processor that executes instructions for mitigating interference in a wireless communication network, the instructions comprising:
receiving a data communication;
determining at least one of a channel condition of the data communication;
determining a slot grouping arrangement of a second data communication based in part on the channel condition;
determining a slot positioning for slots including overhead data relative to slots including traffic data within each group based in part on the channel condition, wherein determining a slot positioning for slots including overhead data relative to slots including traffic data comprises positioning an acknowledgment channel to provide time to decode a traffic channel.

* * * * *